United States Patent Office 3,455,882
Patented July 15, 1969

3,455,882
METHOD OF OXIDIZING ALIPHATIC POLYMERS CONTAINING HYDROXYMETHYL GROUPS
Heinz Hartel and Ilse Ursula Nebel, Oberlar, Germany, assignors to Dynamit Nobel Aktiengesellschaft, Troisdorf, Bezirk, Cologne, Germany, a corporation of Germany
No Drawing. Filed Sept. 29, 1965, Ser. No. 491,380
Claims priority, application Germany, Oct. 9, 1964, D 45,598
The portion of the term of the patent subsequent to June 4, 1985, has been disclaimed
Int. Cl. C08f 27/22, 3/44
U.S. Cl. 260—67       14 Claims

ABSTRACT OF THE DISCLOSURE

The oxidation of polymers containing pendant hydroxy methyl groups using as the oxidizing agent copper oxide and/or copper hydroxy, together with a noble metal or noble metal compound in an alkaline aqueous reaction medium. The particular polymers preferably oxidized according to this invention are the polymeric reaction products of acrolein and formaldehyde. The resultant polymeric acids can be used in the form of their salts as sizing agents, thickening agents, protective colloids, or finishing agents in the paper, leather and textile industries.

---

The present invention relates to a process for the oxidation of aliphatic polymers containing hydroxymethyl groups.

In U.S. Patent No. 3,387,029, issued June 4, 1968, there is disclosed a method for oxidizing polyacrolein or polymethacrolein in alkaline aqueous medium by acting on the polyacrolein or polymethacrolein with a mixture of copper (II) oxide or copper (II) hydroxide, a noble metal or noble metal oxide or hydroxide, preferably in the presence of a solvent for the polyacrolein or polymethacrolein. Further, in accordance with the process described in U.S. Patent No. 3,387,029, issued June 4, 1968, oxygen or an oxygen-containing gas can be simultaneously introduced into the reaction medium for regenerating the oxidizing agent which is used up during the reaction.

It is an object of the present invention to oxidize aliphatic polymers containing hydroxymethyl groups by a process which is efficient and economical.

A still further object is a process for producing such oxidation products continuously.

Additional objects will become apparent from a consideration of the following description and claims:

In a further development of the invention forming the basis of said co-pending application, it has now been found that oxidation products of aliphatic polymers containing hydroxymethyl groups may also be obtained by acting on the latter in the presence of alkali with a mixture of Cu (II) oxide or Cu (II) hydroxide and a noble metal, noble metal oxide or noble metal hydroxide.

Suitable polymers containing hydroxymethyl groups for carrying out the process of the invention are especially polyacrolein-formaldehyde reaction products (PAF) of the structure

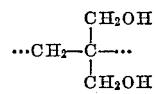

which may also contain CHO or COOH groups, as well as Cannizzaro reaction products of polyacrolein having the following structure

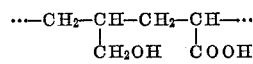

or polyallyl alcohols.

Upon the oxidation of such compounds, the CH$_2$OH groups are converted in whole or in part into COOH groups. If in the oxidation reaction two COOH groups become attached to a C atom, CO$_2$ is split off. There are thus produced, in accordance with the invention, polycarboxylic acids which are similar in their chemical structure to polyacrylic acids.

In addition to the above polymeric compounds, there are also suitable for use as starting materials in the process of the invention polymethacrolein products, such as Cannizzaro reaction products of the structure:

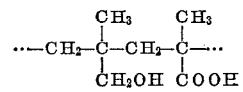

polymethallyl alcohols, and

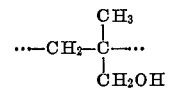

or corresponding products having as a base co-polymers.

Most of these hydroxymethyl group-containing starting materials suitable for use in the oxidation reaction, in accordance with the invention, are more readily soluble in water than are the corresponding polyaldehydes disclosed in U.S. Patent No. 3,387,029 issued June 4, 1968, so that it is possible to operate in substantially more concentrated solutions.

Preferably the oxidation reaction is effected in the presence of a solvent for the aliphatic hydroxymethyl group-containing polymer, for example, in the presence of pyridine, dimethyl sulfoxide, diethyl sulfoxide, dimethyl formamide, or diethyl formamide.

The noble metal, noble metal oxide or hydroxide suitable for use in admixture with the copper oxide or hydroxide include the elements, oxides, and hydroxides of all of the noble metals, such as, for example, mercury, silver, gold, and the platinum metals, i.e., platinum, ruthenium, rhodium, palladium, osmium, and iridium.

The alkaline aqueous medium required for the reaction can be maintained by means of an alkali hydroxide, i.e., sodium hydroxide, potassium hydroxide, or their corresponding carbonates or bicarbonates, as, for example, sodium carbonate, sodium bicarbonate, potassium carbonate, potassium bicarbonate, lithium carbonate, etc.

The reaction conditions for carrying out the aqueous alkaline oxidation of hydroxymethyl group-containing aliphatic polymers in the presence of the above catalyst mixtures are substantially the same as those disclosed in U.S. Patent No. 3,387,029 issued June 4, 1968.

Preferably, the process is effected in the manner that the polymeric starting materials are introduced into aqueous sodium or potassium hydroxide solution. The oxidizing agent is then added in the form of a mixture approximately of the composition CuO or Cu(OH)$_2$ and of a noble metal or noble metal oxide or hydroxide in a molar ratio of Cu noble metal of from 1:1 to about 1000:1 or the catalyst mixture is precipitated in the presence of the polymers from the corresponding water-soluble metal salts. The oxidation reaction is carried out at temperatures of from 0° C. to 100° C., and preferably at temperatures of from 50° C. to 100° C. If oxygen or oxygen-containing gas is simultaneously introduced into the reaction, the spent oxidizing agent is continuously regenerated during the reaction so that it is possible to get along with small quantities of the oxide mixture, for example, 1 to 10% of that quantity which is theoretically required.

The resultant polymeric acids are isolated in the conventional manner, as for instance, by acidification of the aqueous solution of reaction product with a strong acid, i.e., mineral acid, or by concentration of the solutions and precipitation of the salts with inert solvent mixtures such as ether and methanol, or by dialysis and freeze-drying.

Polycarboxylic acids of the type produced in accordance with the invention can be used, for instance, in the form of their salts as sizing agents, thickening agents, protective colloids, or finishing agents in the paper, leather and textile industries.

The invention is further illustrated by the following examples without being restricted thereto:

Example 1

10 g. of polyacrolein formaldehyde reaction product (PAF) were treated with 100 ml. of 20% NaOH, 10.9 g. CuO and 3.5 Ag$_2$O. Thereafter, the mixture was heated to 90 to 100° C. and oxygen then introduced with agitation. Following filtration, the oxidation yield was determined by titration and amounted to 78.7%. Upon acidifying the solution and drying the colorless precipitate, there were obtained 6 g. of polycarboxylic acid corresponding to a yield of 73.3% of theory, calculated as polyacrylic acid and referred to the PAF used. The relative viscosity of a 1% solution in NaOH at 20° C. was 2.13. The infra-red spectrum of the polycarboxylic acid was similar to that of a polyacrylic acid which had been prepared by saponification of polyacrylonitrile.

Example 2

10.5 g. of a polyacrolein Cannizzaro reaction product, 32 g. CuO, and 10.3 g. PdO were heated in 100 ml. of 8% NaOH overnight at a temperature of 50 to 70° C. After the solid phase had been removed and the solution worked up by the procedure described in Example 1, a yield of polycarboxylic acid amounting to 84.0% of theory (calculated as polyacrylic acid) was obtained.

Example 3

25 g. of polyallyl alcohol were dissolved in 2 N NaOH, and Cu(NO$_3$)$_2$·3H$_2$O and AgNO$_3$ in saturated aqueous solutions were added in a quantity such that about 10.9 g. of CuO and 3.5 g. of Ag$_2$O were precipitated, whereupon the mixture was heated overnight at 85 to 90° C. with the introduction of air. After working up in the manner indicated in Example 1, the oxidation yield was determined by titration and amounted to 46.8% of the theoretical yield.

Example 4

11.1 g. of a Cannizzaro reaction product (prepared from a copolymer of 90% acrolein and 10% methacrolein) were introduced into 100 ml. of 2 N KOH; 32 g. of CuO and 950 mg. of Ag$_2$O were then added and the resulting mixture heated overnight at 50 to 70 C. The solids were removed and the solution worked up in the manner described in Example 1; the yield of polycarboxylic acid (calculated as copolymer of 90% acrylic acid and 10% methacrylic acid) was found to be 69.5% of the theoretical yield.

We claim:

1. A process for oxidizing polymerization products of unsaturated aldehydes containing pendant hydroxymethyl groups, which comprises reacting in an alkaline aqueous medium such a polymer with a member selected from the group consisting of Cu(II)O and Cu(II)OH in the presence of a member selected from the group consisting of noble metals, noble metal oxides, and noble metal hydroxides, and recovering the corresponding oxidation product thereby produced.

2. Process according to claim 1 wherein said oxidation product is recovered in the form of its salt.

3. Process according to claim 1, which comprises making and maintaining said aqueous medium alkaline by the addition thereto of a member selected from the group consisting of alkali metal hydroxides, carbonates, and bicarbonates.

4. Process according to claim 1, wherein a molar ratio of copper to the noble metal employed ranges from about 1:1 to 1000:1.

5. Process according to claim 1, wherein said aliphatic polymer-containing hydroxy methyl groups is utilized in the presence of an inert solvent therefor.

6. Process according to claim 1, wherein said aliphatic polymer containing hydroxy methyl groups is a polyacrolein-formaldehyde reaction product having the structure

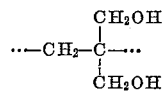

7. Process according to claim 1, wherein said aliphatic polymer containing hydroxy methyl groups is a Cannizzaro reaction product of polyacrolein having the structure

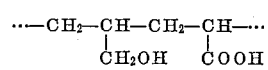

8. Process according to claim 1, wherein said aliphatic polymer containing hydroxy methyl groups is a polyallyl alcohol.

9. Process according to claim 1, wherein said aliphatic polymer containing hydroxy methyl groups is a Cannizzaro reaction product of a polymethacrolein having the structure

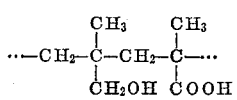

10. Process according to claim 1, wherein said aliphatic polymer containing hydroxy methyl groups is a polymethallyl alcohol.

11. Process according to claim 1, wherein said aliphatic polymer containing hydroxy methyl groups is a Cannizzaro reaction product of polymethacrolein having the following structure:

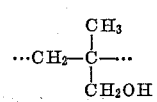

12. A process for oxidizing polymerization products of unsaturated aldehydes containing pendant hydroxymethyl groups, which comprises reacting in an alkaline aqueous medium such a polymer with a member selected from the group consisting of Cu(II)O and Cu(II)OH in the presence of a member selected from the group consisting of noble metals, noble metal oxides, and noble metal hydroxides, simultaneously introducing a member selected from the group consisting of oxygen and gases containing oxygen into said reaction medium during said oxidizing reaction whereby the metal compounds used up in said reaction are regenerated to a higher stage.

13. Process according to claim 12 wherein said oxidation and regeneration treatments are effected at a temperature of about zero to 100° C.

14. Process according to claim 12, wherein said oxidation and regeneration treatments are effected at a temperature of about 50 to 100° C.

References Cited

UNITED STATES PATENTS

| | | | |
|---|---|---|---|
| 3,387,029 | 6/1968 | Hartel et al. | 260—530 |
| 2,353,159 | 7/1944 | Hull | 260—531 |
| 2,924,535 | 2/1960 | Schaefer. | |
| 3,127,374 | 3/1964 | Kern et al. | |
| 3,317,478 | 5/1967 | Nebel et al. | 260—73 |

FOREIGN PATENTS

| | | |
|---|---|---|
| 740,005 | 11/1955 | Great Britain. |
| 500,505 | 7/1965 | Netherlands. |

WILLIAM H. SHORT, Primary Examiner

L. M. PHYNES, Assistant Examiner

U.S. Cl. X.R.

260—91.3, 530, 531

UNITED STATES PATENT OFFICE
CERTIFICATE OF CORRECTION

Patent No. 3,455,882                      July 15, 1969

Heinz Hartel et al.

It is certified that error appears in the above identified patent and that said Letters Patent are hereby corrected as shown below:

Column 3, line 66, "70 C." should read -- 70° C. --.
Column 6, line 2, "500,505" should read -- 6,500,505 --.

Signed and sealed this 9th day of June 1970.

(SEAL)
Attest:

Edward M. Fletcher, Jr.                    WILLIAM E. SCHUYLER, JR.
Attesting Officer                            Commissioner of Patents